UNITED STATES PATENT OFFICE.

JOHN CARNRICK, OF NEW YORK, N. Y.

DIETETIC COMPOUND.

SPECIFICATION forming part of Letters Patent No. 342,575, dated May 25, 1886.

Application filed October 16, 1885. Serial No. 140,380. (No specimens.)

*To all whom it may concern:*

Be it known that I, JOHN CARNRICK, of the city, county, and State of New York, have invented an Improvement in Medicinal Food Products, of which the following is a specification.

The object of this invention is to provide an article of food suitable for invalids, convalescents, persons in infirm health, and others requiring a food at once nutritious and capable of easy assimilation.

My said invention comprises a new composition of matter composed of meat, gluten, or wheat, and milk, one or more of the said elements being in whole or in part digested or converted into peptone.

The details of manufacturing or producing my said composition of matter may be varied within wide limits; but that which I find most advantageous in practice is as follows: I reduce milk to powder by evaporation, either in vacuum or by any other suitable means. I reduce meat, preferably, beef or mutton, to powder, by evaporating the same to dryness, and then mechanically reducing the same to a powdered condition by grinding or otherwise. I take what is known commercially as "gluten," produced by any usual or suitable means, or wheat in its ordinary or any appropriate condition, and reduce the same to powder by grinding or other suitable means. The finer the powder to which the several ingredients are reduced the more intimately will they commingle or associate in the production of my improved composition of matter. I take of the said ingredients—namely, meat, gluten, or wheat, and milk reduced to powder, as aforesaid—equal parts, by weight, and commingle them together. Prior to mingling them, however, I preferably take of the meat a quantity equal to, say, one-fifth of the weight thereof. I add sufficient hydrochloric acid to slightly acidulate the same, preferably about twenty-four fluid ounces of the acid at pharmacopœia strength to one hundred pounds of the dried and powdered meat. I do this at a blood-heat—that is to say, at about 98° Fahrenheit thermometer. At the same time that the hydrochloric acid is added to this portion of the meat, as aforesaid, I add pepsin in the proportion of, say, six and one-half ounces to one hundred pounds of the powdered meat. I then subject the meat thus treated to frequent agitation during from four to six hours, the result being that the meat thus treated is digested or converted into peptone. When desired a greater or less proportion of the meat may be thus digested or converted into peptone; but the proportion above indicated will be found preferable in practice.

When desired, instead of digesting a portion of the meat, as aforesaid, a corresponding portion of the milk-powder may be digested in the same manner; or, if desired, a corresponding portion of the gluten or wheat-powder may be in like manner digested; or, if preferable, the portion of the material to be digested may comprise any two of the aforesaid elements—namely, meat, gluten, or wheat, and milk—or, when desired, the powdered meat, gluten, or wheat and milk having been intermittently mingled, as hereinbefore explained, a suitable proportion—say one and two-thirds per cent.—of the entire weight of the three commingled ingredients may be in like manner digested; or, if preferred, a portion of each of the three ingredients may be separately digested, and these afterward mingled with each other, and with the undigested proportion of said three ingredients, the digested portion being preferably in the ratio hereinbefore set forth to the undigested portion of said three ingredients.

It will be observed that while in my said composition of matter, when made as preferred by me, something less than two per cent. of the composition is peptonized, yet this proportion of peptonized ingredient or ingredients may be varied within very considerable limits without affecting the principle or scope of my said invention, the latter being intended to supply the compound of meat, gluten, or wheat, and milk, in which a sufficient proportion of one or more components is digested or peptonized as to not only render the peptonized portion more readily capable of assimilation, but also in order that by sustaining the progressive fermentation or conversion into peptones of the remaining portion of said composition of matter the complete digestion or assimilation of the other portions of said compound is secured in such manner as to sustain and invigorate the digestive organs, while relieving them of much of the effort required in the ordinary processes of digestion.

After the operation hereinbefore set forth the peptonized portion will be in a liquid condition. It may be either reduced to a powder by further evaporation, and the composition containing the three ingredients, as aforesaid, may be put up for use in a dry or powdered form, or, when preferred, the peptonized portion may be added to the other or non-peptonized portion, and the whole, in a liquid condition, may be put up for use in bottles or other suitable vessels. It is to be remarked that a requisite proportion of the three combined ingredients may be digested or converted into peptone by treating the same at the requisite temperature with a quantity of hydrochloric acid and pepsin sufficient to act on the said proportion of the three ingredients, but not sufficient to exceed in its action the said proportion. This method, however, is not preferred by me.

In those cases where an intensely concentrated peptonized food is desired, the whole or nearly the whole of the three ingredients—meat, gluten, or wheat, and milk—may be treated with the requisite quantity of hydrochloric acid and pepsin. When the components of the compound are peptonized, as aforesaid, the compound may preferably be dissolved in wine or suitably distilled alcohol, or other suitable liquid, for preservation or use.

Any appropriate medicine or any suitable nutritive food may be used at the same time or in conjunction with my new and improved composition of matter herein described.

In lieu of hydrochloric acid and pepsin for digesting a portion of one or more of the ingredients, as above described, I may use a solution of pancreatine, or fluid extract or solution of the digestive principle of pancreas, together with a small per cent. of carbonate of soda.

I have claimed the composition not peptonized in application Serial No. 125,205, filed March 22, 1884.

I am aware that it has been proposed to use powdered extract of meat, gluten, and milk with vegetables and spices for making a sauce; but I make no claim to such a mixture.

What I claim as my invention is—

The peptonized composition of matter composed of meat, gluten, or wheat, and milk, substantially as and for the purpose herein set forth.

JOHN CARNRICK.

Witnesses:
JOHN H. FISHER,
GUNVARD AAS.